Oct. 7, 1958   R. WELLS   2,854,897
APPARATUS FOR MOLDING PULP ARTICLES
Filed Oct. 16, 1956
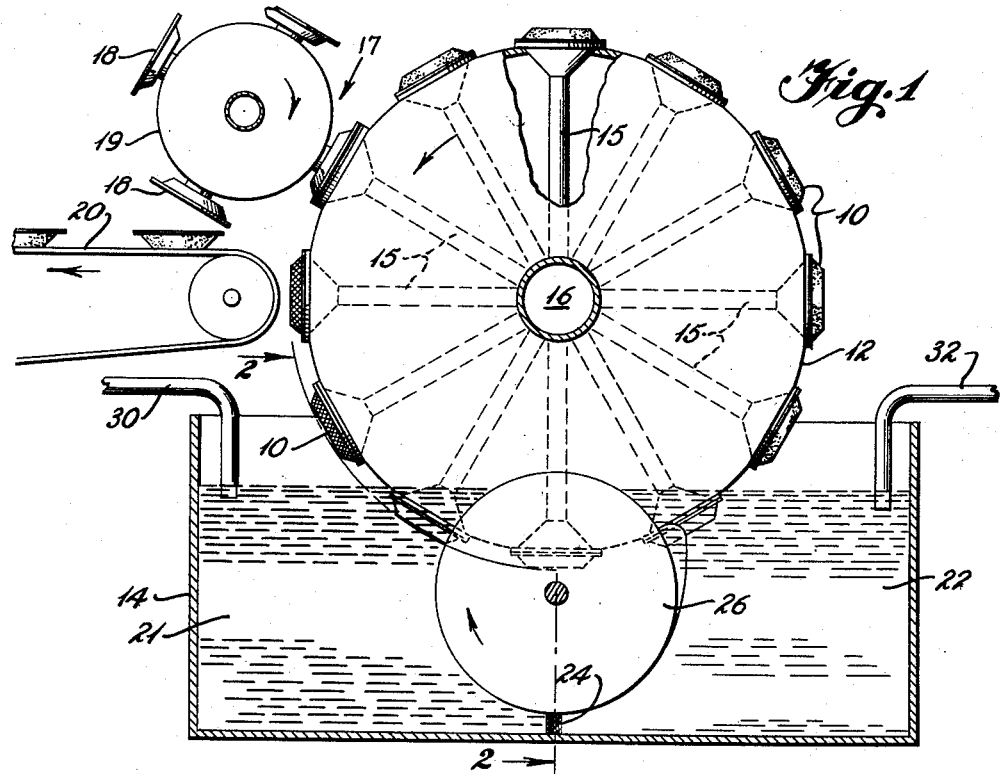
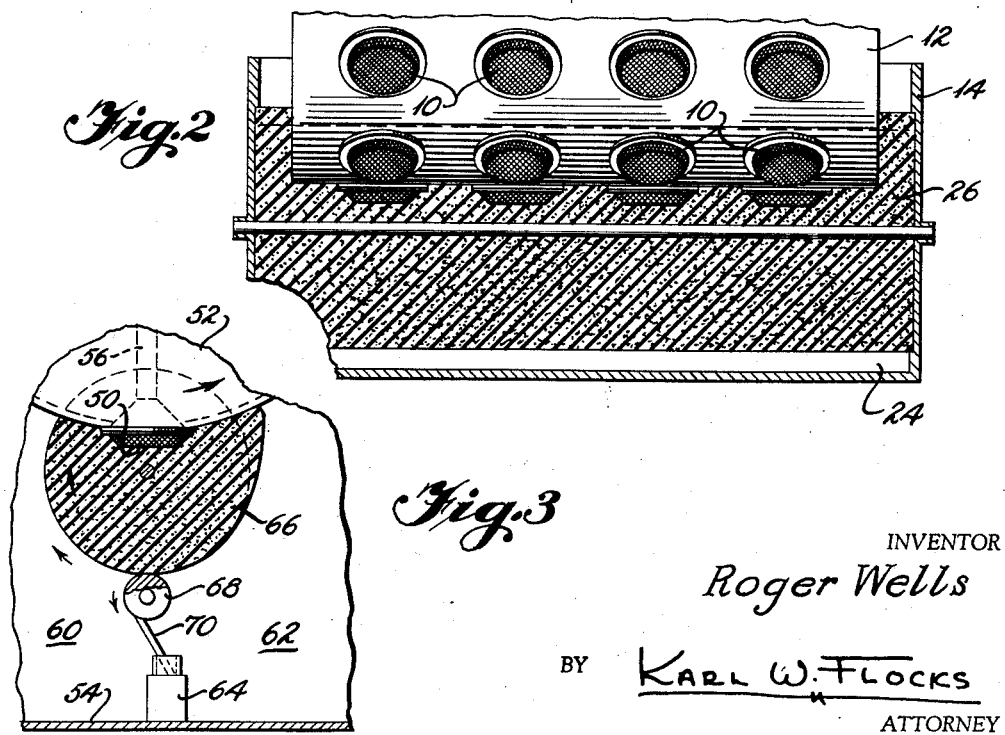
INVENTOR
Roger Wells
BY Karl W. Flocks
ATTORNEY

United States Patent Office 2,854,897
Patented Oct. 7, 1958

2,854,897
APPARATUS FOR MOLDING PULP ARTICLES

Roger Wells, Plattsburg, N. Y., assignor to The Diamond Gardner Corporation, a corporation of Delaware Application October 16, 1956, Serial No. 616,163

9 Claims. (Cl. 92—57)

This invention relates to apparatus for molding pulp articles, and more particularly to apparatus for molding laminated pulp articles.

In the manufacture of molded pulp articles, such as pie plates and other food containers, it is often desirable to provide the articles with a laminated structure in which a plurality of superposed different pulp layers are molded together. These layers may be composed of the same or different grades of pulp. In a laminated molded pulp pie plate, for example, the bottom layer may be composed of a coarse cheap grade of pulp, an intermediate layer of a different grade of pulp may be chosen to impart strength and rigidity to the composite molded plate, and the top layer may be composed of a fine grade of pulp possessing high whiteness and containing a sizing material which imparts a smooth-surfaced finish thereto. It is also desirable in some instances to incorporate different colored dyes in the top and the bottom layers to impart a distinctive appearance to the laminated articles.

It has been customary to manufacture such laminated pulp articles by successively dipping a foraminous mold into a series of tanks or vats, each containing different grades or kinds of pulp stock, to deposit the successive layers of pulp on the mold. Usually, these tanks have been separate units, and the mold or a series of molds has been advanced into and out of the tanks in a plurality of separate successive operations. It has been suggested that molding machines with a single tank be provided with partitions intended to separate different grades of pulp stock through which a mold is advanced successively. However, these suggested machines are unsatisfactory from a practical standpoint, because of excessive leakage past the partitions which would result in gradual admixture of the different grades of pulp until the purpose of the machine is defeated.

An object of the present invention is to provide new and improved apparatus for molding laminated pulp articles.

Another object of the invention is to provide new and improved apparatus for partitioning a single tank into compartments containing different grades of pulp stock through which a mold may be advanced successively without causing admixture of the different grades of pulp.

Still another object of the invention is to provide a new and improved liquid seal between different portions of a slurry tank for a pulp molding machine.

Other objects and the nature and advantages of the instant invention will be apparent from the following description taken in conjunction with the accompanying drawings, wherein:

Fig. 1 is a side elevational view, partially in section, of a pulp molding machine embodying the invention;

Fig. 2 is a vertical sectional view taken along the line 2—2 of Fig. 1; and

Fig. 3 is a fragmentary vertical sectional view of a second embodiment of the invention.

Referring to Figs. 1 and 2, a plurality of foraminous molds 10 are located at equal intervals circumferentially spaced on the periphery of a cylindrical drum 12 mounted horizontally for rotation on its axis above a slurry tank 14. Each of the molds 10 is connected by one of a plurality of radial channels 15 to a central hollow shaft 16 extending axially through the drum 12 and communicating with an exterior source of suction (not shown). Driving means (not shown) operatively connected to the shaft 16 is provided for rotating the drum 12 either continuously or intermittently. During rotation of the drum 12 the molds 10 are advanced successively through liquid pulp slurry contained in the tank 14 while suction is applied to the molds 10 through the channels 15. The suction applied during the immersion of the molds 10 causes pulp fibers to be extracted from the slurry and deposited onto the molds, thereby forming initially molded pulp articles. In the usual manner, the suction is continued while the molds 10 are advanced upwardly above the slurry to extract excess moisture from the preforms until the molds reach a transfer mechanism indicated generally at 17, where the suction on the successive molds is shut off momentarily while the mechanism 17 removes the initially formed articles.

The transfer mechanism 17 is conventional in construction. It includes a plurality of dies 18 contoured to fit against the successive molds 10 to remove pulp preforms therefrom. The dies 18 are mounted radially on a rotatable carrier 19 positioned adjacent to the drum 12 and directly over one end of a conveyor belt 20, which may transport the pulp articles to a drier (not shown). Suction may be applied intermittently to the dies 18 to enable them to remove the pulp articles from the successive molds 10 and then drop them onto the conveyor belt 20. The carrier 19 is rotatable in synchronization with the drum 12 and at a greater speed than the drum 12, so that the dies 18 may be mounted at only four equal intervals on the carrier 19 and yet cooperate with the molds 10, which may be mounted at more than four equal intervals on the periphery of the drum 12.

The molds 10 are shown located at twelve equal intervals on the periphery of the drum 12, but it is evident that the number of intervals may be varied from fewer to many more than twelve depending upon the size of the drum and the size and spacing of the molds. At each of these intervals four of the molds 10 may be mounted in a row, as shown in Fig. 2, or any convenient number from only one to many more than four of the molds may be mounted at each interval on the periphery of the drum 12. It is also evident that instead of employing the drum 12, a wheel or any other suitable type of carrier may be employed to advance the molds 10 successively through the tank 14.

Laminated molded pulp articles are formed on the molds 10 by successively depositing two different layers of pulp fibers on these molds as they are advanced through the tank 14. This result is achieved by dividing the tank into two separate sections or compartments 21 and 22, each of which contains a different pulp slurry. The molds 10 advance through the tank 14 in an arcuate path, first passing through the compartment 21 in which a slurry of one grade of pulp stock is maintained, and then passing through the compartment 22 where a slurry of a different pulp stock is present. The two slurries in the compartments 21 and 22 may be composed of the same grade of pulp stock in different concentrations, or they may be composed of distinctly different grades of pulp stock in any suitable concentrations. For example, a slurry of groundwood pulp stock may be placed in one section of the slurry tank, and a slurry of sulphite pulp stock may be maintained separately in another section of the tank. Although only two compartments or sections of the tank 14 are employed in the illustrated embodiment of the invention, it is obvious that three or more compartments could be provided in different portions of the tank 14, if desired, to produce molded pulp articles having a corresponding number of laminations.

In accordance with the present invention, novel means is provided for maintaining separation between the compartments 21 and 22, and for preventing any admixing of them while the drum 12 and the molds 10 thereon are being advanced therethrough. A fixed vertical partition 24 extends completely across and projects upwardly from the bottom of the tank 14 at a point intermediate the ends thereof and between the compartments 21 and 22. At the top of the partition 24 a cylindrical resilient roller 26 is journalled in the side walls of the tank 14 for rotation in snug engagement with the bottom and side walls of the drum 12 and the top of the partition 24. The roller 26 is preferably composed of sponge rubber, or some similarly soft resilient material, and it is desirable for the sponge rubber roller 26 to be unicellular, that is, to have discrete non-intercommunicating cells rather than communicating interconnecting cells, in order to prevent any seepage of liquid slurry through the body of the roller. Due to its resilient nature, the roller 26 conforms readily to the contours of the bottom and part of the side walls of the rotating drum 12 and to the projecting rows of the molds 10 mounted thereon. The roller 26 also extends completely across the tank 14 and into engagement with the side walls thereof.

The roller 26 fits smoothly against the periphery of the drum 12 in the intervals between the locations where the molds 10 are mounted thereon, thereby allowing virtually none of the slurry to be swept past the roller 26 during rotation of the drum 12. As each of the molds 10 or each row thereof advances past the roller 26, the resilient nature of the roller 26 causes it to indent sufficiently to conform and fit snugly against the contours of the molds. Any residual quantity of pulp stock which may be swept past the roller 26 while clinging to small crevices or edges of the molds 10, will be sucked into these molds before it can become mingled with the pulp stock on the other side of the roller 26, since the suction is continuously applied to the molds during their passage through the tank 14 on both sides of the roller 26. Thus, a liquid seal is maintained between the drum 12 and the roller 26 while they rotate together in opposite directions. Rotation may be imparted to the roller 26 by its frictional contact with the periphery of the drum 12, or a separate driving means may be provided to rotate the roller 26 at the same peripheral speed as that of the drum 12.

A fresh supply of pulp slurry is admitted when needed into the compartment 21 through a supply pipe 30, and a supply pipe 32 is provided to supply pulp slurrry to the compartment 22. The supply pipes 30 and 32 may be provided with float controlled valves (not shown), to maintain the slurries in the compartments 21 and 22 at the desired constant level automatically. The upper level of the slurries in the two compartments 21 and 22 may be maintained at approximately equal heights above the bottom of the tank 14 and below the top of the roller 26.

Fig. 3 shows an embodiment of the invention in which modified means is provided for preventing leakage of liquid pulp slurry past the liquid seal which divides the slurry tank into separate sections or compartments. A plurality of foraminous molds, of which only a mold 50 is shown, are located at equal intervals circumferentially spaced on the periphery of a cylindrical drum 52, which is similar in construction and in operation to the drum 12 shown in Figs. 1 and 2. The drum 52 is mounted for rotation above a tank 54, of which only a portion of the bottom thereof is illustrated. The mold 50 is connected by a channel 56 extending radially through the drum 52 to an axial hollow shaft (not shown) communicating with an exterior source of suction. The tank 54 is divided into two separate sections or compartments 60 and 62 by a vertical partition 64 extending completely across and projecting upwardly from the bottom of the tank 54 at a point intermediate its ends. Above the partition 64 a cylindrical resilient roller 66, which is preferably composed of smooth-surfaced unicellular sponge rubber, is journalled in the side walls of the tank 54 for rotation in snug engagement with the periphery of the drum 52. The roller 66 forms a liquid seal with the periphery of the drum 52, in the same manner as the roller 26 described in the first embodiment of the invention illustrated in Figs. 1 and 2. However, the roller 26 rotates in snug engagement with the top of the partition 24, while the roller 66 is spaced above the partition 64.

In order to prevent pulp slurry from being carried past the partition 64 on the bottom of the resilient roller 66, a smaller cylindrical roller 68 is mounted in contact with the roller 66 in parallel relationship and immediately therebelow. The roller 68 is constructed of a smooth-surfaced hard material selected to avoid excessive abrasive or frictional wear on the softer roller 66. Suitable materials for this purpose include hard rubber, bronze and steel. A doctor blade 70, mounted on the top of the partition 64, engages the bottom of the roller 68 to form a liquid seal therewith. By this arrangement, an effective liquid seal is formed between the compartments 60 and 62 of the tank 54, and excessive abrasive or frictional wear on the elements of the seal is prevented.

Apparatus embodying the invention enables laminated pulp articles to be molded in a single slurry tank divided into separate compartments containing different grades of pulp stock through which a series of molds may be advanced successively, without causing any admixture of the different grades of pulp stock. Laminated articles produced in this manner possess considerably greater strength than similar unlaminated articles. The individual layers of the laminated articles produced by apparatus embodying the invention are securely bonded and interfelted together, and the adhesion between the successive layers is much stronger than it would be if the layers were molded independently and subsequently joined after they had partially dried. Furthermore, apparatus embodying the invention is considerably more simple in construction and in operation than the apparatus employed heretofore for manufacturing laminated pulp articles, thereby requiring less maintenance and a smaller capital investment in manufacturing equipment. Consequently, the invention enables a superior product to be produced less expensively, and these factors are particularly important in the mass production of low unit cost items, such as molded pulp articles such as plates and containers.

It will be obvious to those skilled in the art that various changes may be made without departing from the spirit of the invention and therefore the invention is not limited to what is shown in the drawings and described in the specification, but only as indicated in the appended claims.

What is claimed is:

1. Apparatus for molding pulp articles, comprising a rotatable drum, a plurality of foraminous molds mounted on the periphery of the drum, a slurry tank mounted below the drum, a vertical partititon mounted in the tank for dividing it into a plurality of separate compartments each containing pulp slurry through which the molds are advanced successively during rotation of the drum, and a resilient roller mounted between and rotatable in contact with the top of the partition and the bottom of the drum, said roller forming a liquid seal between the compartments to prevent admixture of the slurry therein as the molds advance therethrough.

2. Apparatus for molding pulp articles, comprising a rotatable drum, a plurality of foraminous molds mounted on the periphery of the drum, a slurry tank mounted below the drum, a vertical partition extending completely across the tank and projecting upwardly from the bottom thereof at a point intermediate the ends of the tank for dividing the tank into a plurality of separate compartments each containing pulp slurry through which the molds are advanced successively during rotation of the drum, and a resilient roller journalled in the side walls of the tank for rotation between and in snug engagement with the top of the partition and the bottom of the drum, said roller forming a liquid seal between the compartments to prevent admixture of the slurry therein as the molds advance therethrough.

3. Apparatus for molding pulp articles, comprising a rotatable drum, a plurality of foraminous molds mounted in rows at equal intervals on the periphery of the drum, a slurry tank mounted below the drum, a vertical partition extending completely across the tank and projecting upwardly from the bottom thereof at a point intermediate the ends of the tank for dividing the tank into a plurality of separate compartments each containing pulp slurry through which the molds are advanced successively during rotation of the drum, and a smooth-surfaced sponge rubber roller journaled in the side walls of the tank for rotation between and in snug engagement with the top of the partition and the bottom of the drum, said roller extending completely across the tank and forming a liquid seal between the compartments to prevent admixture of the slurry therein as the molds advance therethrough.

4. Apparatus for molding pulp articles, comprising a rotatable drum, a plurality of foraminous molds mounted in rows at equal intervals on the periphery of the drum, a slurry tank mounted below the drum, a vertical partition extending completely across the tank and projecting upwardly from the bottom thereof at a point intermediate the ends of the tank for dividing the tank into a plurality of separate compartments each containing pulp slurry through which the molds are advanced successively during rotation of the drum, and a smooth-surfaced sponge rubber roller journalled in the side walls of the tank for rotation between and in snug engagement with the top of the partition and the bottom and part of the side walls of the drum, said roller extending completely across the tank and into engagement with the side walls of the tank, thereby forming a liquid seal between the compartments to prevent admixture of the slurry therein as the molds advance therethrough.

5. Apparatus for molding pulp articles, comprising a rotatable carrier, a plurality of foraminous molds mounted on the periphery of the carrier, a slurry tank mounted below the carrier, a vertical partition mounted in the tank for dividing it into a plurality of compartments each containing pulp slurry through which the molds are advanced successively during rotation of the carrier, a roller mounted in contact with the bottom of the carrier, a second roller mounted below and in contact with the bottom of the first-mentioned roller, and a doctor blade mounted at the top of the partition in contact with the bottom of the second roller, said rollers and doctor blade forming a liquid seal between the compartments to prevent admixture of the slurry therein as the molds advance therethrough.

6. Apparatus for molding pulp articles, comprising a rotatable drum, a plurality of foraminous molds mounted on the periphery of the drum, a slurry tank mounted below the drum, a vertical partition extending completely across the tank and projecting upwardly from the bottom thereof at a point intermediate the ends of the tank for dividing the tank into a plurality of separate compartments each containing pulp slurry through which the molds are advanced successively during rotation of the drum, a resilient roller journalled in the side walls of the tank for rotation in snug engagement with the bottom of the drum, a hard roller mounted below and in contact with the bottom of the resilient roller, and a doctor blade mounted at the top of the partition and extending across the tank in contact with the bottom of the hard roller, said rollers and doctor blade forming a liquid seal between the compartments to prevent admixture of the slurry therein as the molds advance therethrough.

7. Apparatus for molding pulp articles, comprising a rotatable drum, a plurality of foraminous molds mounted in rows at equal intervals on the periphery of the drum, a slurry tank mounted below the drum, a vertical partition extending completely across the tank and projecting upwardly from the bottom thereof at a point intermediate the ends of the tank for dividing the tank into a plurality of separate compartments each containing pulp slurry through which the molds are advanced successively during rotation of the drum, a smooth-surfaced sponge rubber roller journalled in the side walls of the tank for rotation in snug engagement with the bottom of the drum, a smaller hard roller mounted below and in contact with the bottom of the resilient roller, and a doctor blade mounted at the top of the partition and extending across the tank in contact with the bottom of the hard roller, said rollers and doctor blade forming a liquid seal between the compartments to prevent admixture of the slurry therein as the molds advance therethrough.

8. Apparatus for molding pulp articles, comprising a generally cylindrical mold carrier mounted rotatably partially submerged in a tank containing pulp slurry, a plurality of foraminous molds mounted at intervals on the periphery of the carrier, a vertical partition mounted intermediate opposite ends of the tank for dividing it into separate compartments through which the molds are advanced successively during rotation of the carrier, and a resilient roller mounted rotatably at the top of the partition in liquid sealing contact with the carrier across its entire width for maintaining a liquid seal between the compartments to prevent admixture of the slurry therein as the molds advance therethrough.

9. Apparatus for molding pulp articles, comprising a generally cylindrical mold carrier mounted rotatably partially submerged in a tank containing pulp slurry, a plurality of foraminous molds mounted at intervals on the periphery of the carrier, a vertical partition mounted intermediate opposite ends of the tank for dividing it into separate compartments through which the molds are advanced successively during rotation of the carrier, and a resilient roller journalled in opposite side walls of the tank for rotation between and in liquid sealing contact with the top of the partition and with the carrier across its entire width, said roller extending completely across the tank into sealing engagement with the side walls thereof and bulging upwardly around opposite ends of the carrier into engagement with a portion of the side walls thereof, thereby maintaining a liquid seal between the compartments to prevent admixture of the slurry therein as the molds advance therethrough.

References Cited in the file of this patent

UNITED STATES PATENTS

| | | |
|---|---|---|
| 844,513 | Gill | Feb. 19, 1907 |
| 1,730,405 | Chaplin | Oct. 8, 1929 |